March 6, 1928.  
H. E. BARKER  
DENTAL DEVICE  
Filed Jan. 15, 1927
1,661,713
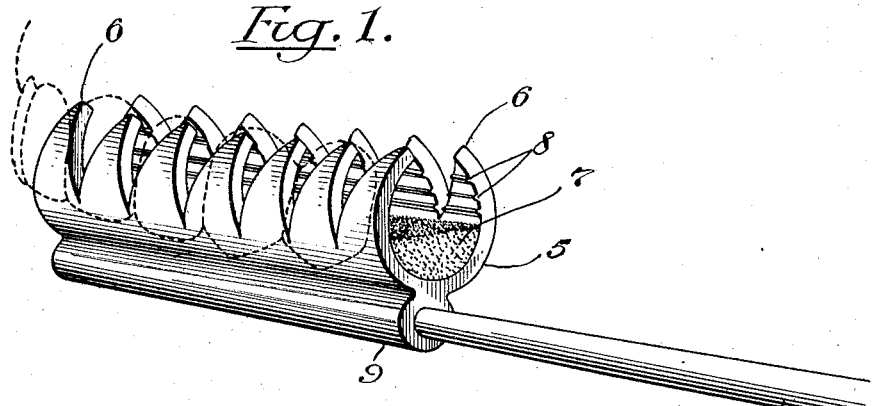
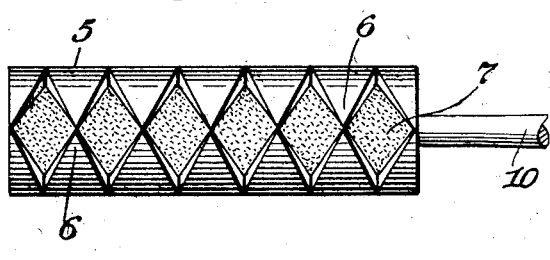
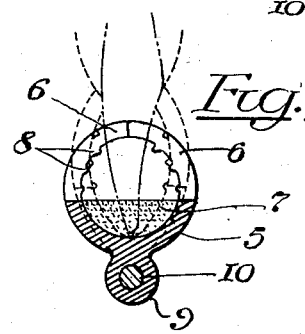
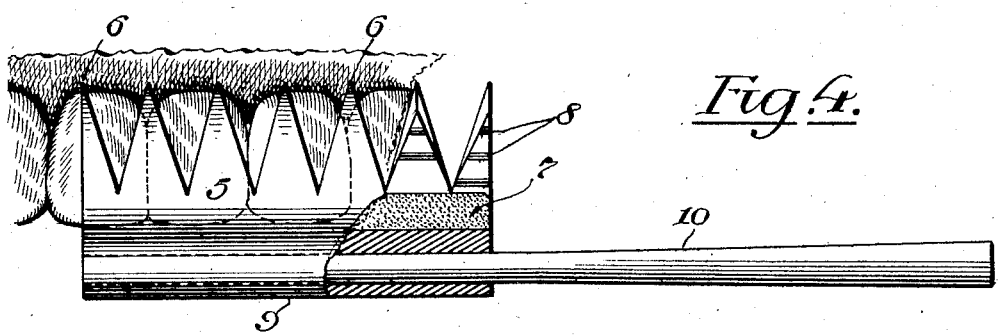
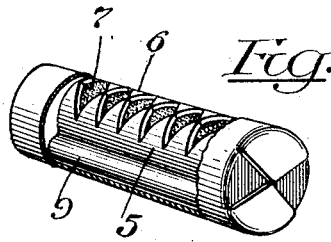
Inventor  
Horace E. Barker  
by his Attorney  
John B. Nolan Patented Mar. 6, 1928.

1,661,713

UNITED STATES PATENT OFFICE.

HORACE E. BARKER, OF BROOKLYN, NEW YORK.

DENTAL DEVICE.

Application filed January 15, 1927. Serial No. 161,257.

The object of my invention is to provide a simple, inexpensive and efficient device for cleaning the teeth and for massaging the gums; which device is intended to be discarded after once using, thus lessening the danger of infection.

The invention comprises a tubular body of soft yielding material, such as rubber, whereof one side is divided throughout its length and formed to present two opposing series of arcuate serrations or rubbing members which may be manipulated in a manner to effect the cleaning of the exposed surfaces of the teeth, and also the massaging of the gums without liability of injury to the tissues.

The invention also comprises such a serrated tubular structure having a dentifrice containing space therein below the bases of the rubbing members, and adapted to be encased in a protecting covering.

The invention also comprises novel features of construction which will be hereinafter described and claimed.

In the drawings—

Figure 1 is a perspective view of a dental device embodying my invention, as in actual use, the teeth and gum being indicated by dotted lines.

Fig. 2 is a plan of the device.

Fig. 3 is a transverse section thereof as in use.

Fig. 4 is a side elevation, partly in section, of the device as in use.

Fig. 5 is a perspective view of the device as wrapped and sealed, the cover being partially torn away.

Referring to the drawings, 5 designates a tubular body of yielding substance or material, such as soft resilient rubber, which is split or divided longitudinally through one side thereof and serrated along its meeting edges to form two opposing series of elongated tapering arcuate serrations or rubbing members, 6, extending towards each other and of general saw tooth form which possess ample firmness to permit and effect the application of dentifrice 7 with proper friction to the teeth, but which members have sufficient flexibility to avoid liability of injury to soft tissues.

The free extremities of the rubbing members 6 are pointed and are normally held in closed or gripping position by the inherent elasticity of the tubular body, and therefore, such members may be applied to the teeth in a manner to engage both labial and lingual surfaces thereof at the same time. When the members are thus applied to the teeth and the device is manipulated with rotary, longitudinal or vertical motions, the pointed extremities of the arcuate rubbing members by their resilient gripping tendency penetrate and effect the cleaning of the interdental spaces, which extremities, when the body 5 is contracted by laterally applied finger-pressure, bear against and along the gum line without injury to the soft tissues. All other exposed surfaces of the teeth are readily reached and acted upon by the resilient members since the tubular body can be bent to any desired angle or curvature by the user. As illustrated, these members, by virtue of their tapering formation, present angular rubbing edges which exert a substantial scraping effect on the surfaces of the teeth.

By properly manipulating the device to effect the gentle pressure of the yielding rubbing members against the gums the latter can be efficiently massaged without liability of injury to the tissues.

I preferably provide the inner surfaces of the members 6 with ribs or protuberances 8 which serve as carriers for the dentifrice during the use of the device on the teeth; and I also preferably form on the back of the tubular body a longitudinally perforated rib or projection 9 for the reception of a stem or handle 10 by means of which the device can be manipulated similarly to an ordinary tooth brush, if desired.

The tubular construction of the body 5 affords below the bases of the rubbing members a space for the retention of dentifrice in powder or paste form, which body, thus charged, may be wrapped and sealed to present a suitable commercial package, as illustrated in Fig. 5.

I claim—

1. A dental device comprising a tubular body of soft resilient material divided longitudinally through one side thereof and serrated along its meeting edges to form two opposing series of arcuate rubbing members which are normally held in contracted position by the inherent elasticity of said body.

2. A dental device comprising a tubular body of soft resilient material divided longitudinally through one side thereof and serrated along its meeting edges to form two opposing series of arcuate rubbing members which are normally held in contracted position by the inherent elasticity of said body, said body having a longitudinally perforated projection adapted to receive a suitable handle.

3. A dental device comprising a tubular body of soft resilient material divided longitudinally through one side thereof and serrated along its meeting edges to form two opposing series of elongated arcuate rubbing members of saw-tooth form which are normally held in contracted position by the inherent elasticity of said body.

4. A dental device comprising a tubular body of soft resilient material divided longitudinally through one side thereof and serrated along its meeting edges to form two opposing series of arcuate rubbing members which are normally held in contracted position by the inherent elasticity of said body, the inner surfaces of said members having protuberances thereon.

5. A dental device comprising a tubular body of soft resilient material divided longitudinally through one side thereof and serrated along its meeting edges to form two opposing series of arcuate rubbing members which are normally held in contracted position by the inherent elasticity of said body, there being a dentifrice space in said body below the bases of the rubbing members.

6. A dental device comprising a body having opposing rows of arcuate rubbing members extending towards each other and of general saw-tooth form.

Signed at New York in the county and State of New York this 11th day of January, A. D. 1927.

HORACE E. BARKER.